3,234,274
PRODUCTION OF TEREPHTHALYL CHLORIDE AND CHLOROACETYL CHLORIDES

Gustav Renckhoff, Witten (Ruhr), and Wolfgang Wolfes, Witten-Bommern, Germany, assignors to Chemische Werke Witten, Gesellschaft mit beschrankter Haftung, Witten (Ruhr), Germany
No Drawing. Filed Dec. 14, 1960, Ser. No. 75,665
Claims priority, application Germany, Dec. 21, 1959, C 20,408
3 Claims. (Cl. 260—544)

The present invention relates to the production of terephthalic acid dichloride, and more particularly, to the reaction of $\alpha,\alpha'$-hexachloro-p-xylene with equimolecular amounts of mono-, di-, or tri-chloro-acetic acid.

It is known to react benzotrichloride with a carboxylic acid, particularly acetic acid, to form benzoyl chloride and the corresponding carboxylic acid chlorides. According to the indications of Rabjohn, Journal of the American Chemical Society, 76, pages 5479–5481 (1954), the analogous reaction of $\alpha,\alpha'$-hexachloro-p-xylene with aliphatic acids, particularly acetic acid, to form terephthalic acid dichloride and the corresponding aliphatic acid chloride takes place only with a poor yield and is, therefore, not usable for the production of these chlorides. Additionally, the reaction with phthalic acid and succinic acid yields mixtures which cannot be separated in a simple manner.

Rabjohn, therefore, conducted the saponification of the $\alpha,\alpha'$-hexachloro-p-xylene by reaction with maleic acid, which thereby changes over to maleic acid anhydride. During this reaction, however, only two of the six chlorine atoms of the $\alpha,\alpha'$-hexachloro-p-xylene are utilized for the formation of acid chloride, whereas the remaining four are lost as hydrogen chloride.

It has now been found that $a,a'$-hexachloro-p-xylene can be made into terephthalic acid dichloride with an excellent yield when $\alpha,\alpha'$-hexachloro-p-xylene is reacted with mono-, di-, or tri-chloro-acetic acid by heating to higher temperatures, preferably to temperatures ranging from 80 to 120° C., in the ratio of 1 mol $\alpha,\alpha'$-hexachloro-p-xylene to 2 mols of chloroacetic acid. The addition of acid catalysts also aids the reaction and, if necessary, the mixture may be stirred.

The reaction according to the present invention surprisingly produces an excellent yield of a mixture of the corresponding chloroacetyl chloride and terephthalic acid dichloride, which mixture can easily be separated by distillation into the corresponding pure acid chlorides. The reaction according to the present invention utilizes four of the chlorine atoms of the $\alpha,\alpha'$-hexachloro-p-xylene employed in the formation of the acid chlorides.

The formation of terephthalic acid dichloride was not to be expected from the reaction according to the present invention, since the reaction of $\alpha,\alpha'$-hexachloro-p-xylene with acetic acid, which is not substituted by halogen, furnishes only small quantities of terephthalic acid dichloride and yields predominantly a complex mixture of non-distillable products.

Examples of the acid catalysts usable in the present invention include, for example, zinc chloride, iron chloride, etc.

The process according to the present invention also represents an excellent method for producing the pure chloroacetyl chlorides, which can be obtained with known chlorination agents, such as thionyl chloride, from the corresponding chloroacetic acid only with an unsatisfactory yield.

It is an object of the present invention, therefore, to produce terephthalic acid dichloride in a simple and effective manner and with an excellent yield.

It is also an object of the present invention, therefore, to produce pure chloroacetyl chlorides in a simple and effective manner and with an excellent yield.

It is a further object of the present invention to produce terephthalic acid dichloride and chloroacetyl chlorides from $\alpha,\alpha'$-hexachloro-p-xylene and chloroacetic acid in a simple and effective manner and with an excellent yield.

Other objects of the present invention and advantageous features thereof will become apparent as the description proceeds.

The reaction according to the present invention is preferably conducted in such a manner that 1 mol of $\alpha,\alpha'$-hexachloro-p-xylene is melted together, while stirred, with 2 mols of the chloroacetic acid employed according to the present process and, after addition of the acid catalyst, is heated to about 100° C. until the formation of hydrogen chloride is terminated. Thereupon, the catalyst is decanted or rendered ineffective by the addition of an inhibitor, such as lauric acid diethylamide, and the mixture of acid chlorides produced is separated by distillation into terephthalic acid dichloride and the chloroacetic acid chlorides produced according to the chloroacetic acid starting material employed.

The following examples serve to illustrate the present invention without, however, limiting the same thereto.

Example I 284 g. mono-chloroacetic acid (3 mol) and 469 g. $\alpha,\alpha'$-hexachloro-p-xylene (1.5 mol) are melted together. After admixture of 0.5 g. iron (III) chloride, an active formation of hydrogen chloride commences at approximately 80° C., which formation is terminated after about 3 hours. The reaction mixture is thereafter distilled with the addition of 0.5 g. lauric acid diethylamide, whereby 314 g. chloroacetyl chloride, corresponding to 93% of the theoretical amount, are initially carried over at a temperature of between 102–110° C. at atmospheric pressure. Thereafter, the distillation in vacuo is continued and 236 g. terephthalic acid dichloride, corresponding to 78% of the theoretical amount, are yielded at a temperature of between 140–148° C. at 15 mm.

Example II 163 g. tri-chloroacetic acid (1 mol) and 156 g. $\alpha,\alpha'$-hexachloro-p-xylene (0.5 mol) are heated to 100–110° C. with 5 g. freshly melted zinc chloride and while stirring for approximately 2–3 hours until the formation of hydrogen chloride slackens. Thereupon, the zinc chloride is decanted and the products are distilled. The yield is 169 g. of tri-chloroacetyl chloride at 760 mm. and at a temperature of between 112–120° C., corresponding to 93% of the theoretical amount, while the subsequent vacuum distillation at 140–148° C. at 15 mm. as the second fraction yields 84 g. terephthalic acid dichloride, corresponding to 83% of the theoretical amount.

Of course, many changes and variations in the reaction conditions, duration, the manner of working-up the reaction mixture, the manner of isolating and purifying the resulting products, and the like, may be made by those skilled in the art in accordance with the principles set forth hereinabove, and we, therefore, do not wish to be limited to the details and specific examples described hereinabove only for illustrative purposes, but intend to cover all such changes and modifications as are encompassed by the scope of the appended claims.

We claim:
1. A process for the production of terephthalic acid dichloride and chloroacetyl chlorides which comprises reacting $\alpha,\alpha'$-hexachloro-p-xylene with chloroacetic acid by heating a mixture of the same containing essentially one mole of α,α'-hexachloro-p-xylene to every 2 mols of chloroacetic acid to a temperature of between approximately 80 and 120° C. to form terephthalic acid dichloride and the chloroacetyl chloride corresponding to said chloroacetic acid, and thereafter separating said terephthalic acid dichloride and said chloroacetyl chloride.

2. A process for the production of terephthalic acid dichloride and chloroacetyl chlorides which comprises reacting α,α'-hexachloro-p-xylene with a compound selected from the group consisting of mono-, di- and trichloroacetic acid by heating a mixture of the same containing one mol of α,α'-hexachloro-p-xylene to every 2 mols of said compound to a temperature of between approximately 80 and 120° C. to form terephthalic acid dichloride and the chloroacetyl chloride corresponding to said compound.

3. A process for the production of terephthalic acid dichloride and chloroacetyl chlorides as defined in claim 2, wherein said reaction is carried out in the presence of a catalyst selected from the group consisting of zinc chloride and iron chloride.

References Cited by the Examiner
UNITED STATES PATENTS

| | | | |
|---|---|---|---|
| 1,921,767 | 8/1933 | Mills | 260—544 X |
| 1,965,556 | 7/1934 | Mills | 260—544 X |
| 2,525,723 | 10/1950 | Rabjohn | 260—544 |
| 2,928,876 | 5/1960 | Spivack et al. | 260—566 |

LORRAINE A. WEINBERGER, *Primary Examiner.*
LEON ZITVER, *Examiner.*